July 19, 1927.
M. BOZSIN
1,636,167
TURRET TOOL POST
Filed June 15, 1923
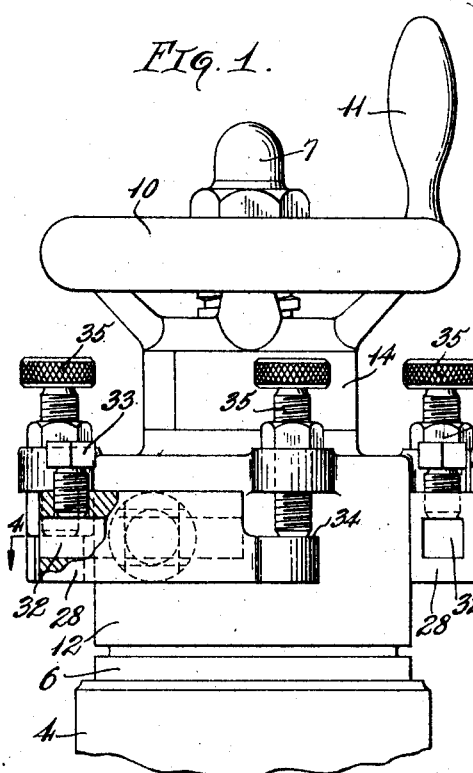
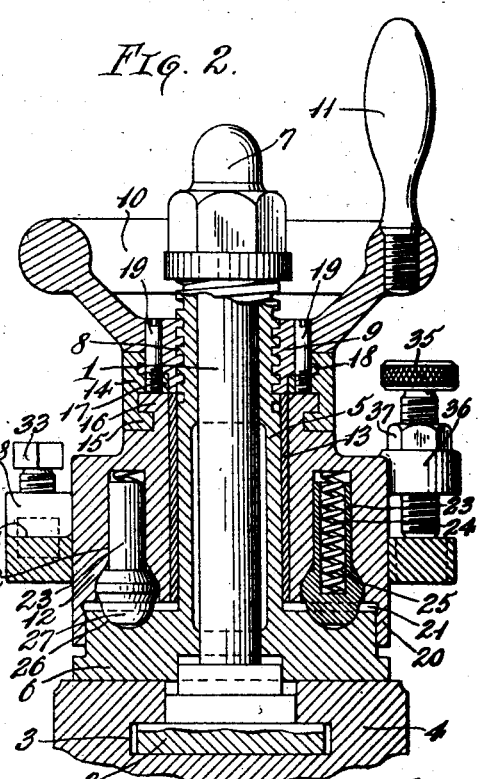
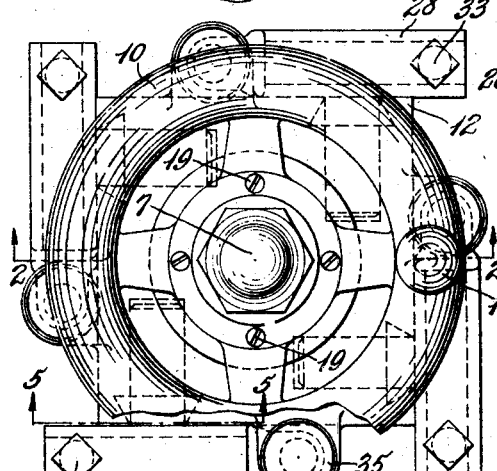
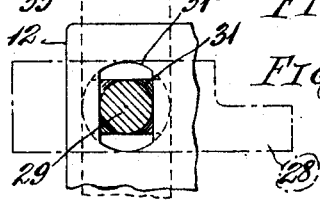
Inventor
Milan Bozsin
By Brockett, Hyde & Milburn
Attorneys Patented July 19, 1927.

1,636,167

UNITED STATES PATENT OFFICE.

MILAN BOZSIN, OF CLEVELAND, OHIO.

TURRET TOOL POST.

Application filed June 15, 1923. Serial No. 645,588.

This invention relates to turret tool posts such as are used for mounting in a lathe or the like a plurality of tools for selective use.

The object of the present invention is to provide an improved turret tool post in which any of the several tools secured therein may be easily and quickly moved to and securely clamped in operative position; in which the several tools are not only individually adjustable longitudinally toward and from the work, but may also be inclined vertically at any desired angle, thereby enabling more accurate and efficient results to be obtained.
Further objects of the invention are in part obvious and in part will appear more in detail hereinafter.

In the drawing, which represents one suitable embodiment of the invention, Fig. 1 is a side elevation of my improved tool post; Fig. 2 is a vertical sectional view thereof, taken on the line 2—2, Fig. 3; Fig. 3 is a plan view; Fig. 4 is a cross sectional view, taken on the line 4—4, Fig. 1; and Fig. 5 is a detail view illustrating the mounting of the tool holders.

Referring to the drawing, my improved tool post comprises a spindle 1 having a suitable head 2 for insertion, for example, in the usual T slot 3 in the ordinary, standard lathe rest 4. Snugly surrounding said post is a sleeve 5 having an outwardly extending annular base 6 adapted to be firmly clamped against the upper surface of the lathe rest 4 by a clamping nut 7 threaded onto the upper end portion of post 1 and bearing upon the upper end of sleeve 5. The upper end portion of sleeve 5 is threaded, as at 8, to receive the threaded depending hub 9 of a suitable hand wheel 10, which is adapted to be raised and lowered on the threaded end portion of sleeve 5 by means of an upright handle 11 on the rim of said wheel. To expedite the raising and lowering movements of the wheel, square screw threads are employed, as clearly indicated in Fig. 2.

12 represents the rotatable tool head which surrounds sleeve 5 or a bushing 13 may be interposed therebetween, which bushing may be readily replaced as wear occurs. The upper reduced end portion of said tool head has connection with the lower end portion of the depending wheel hub 9 by means of suitable semi-circular ring members 14 surrounding said portions. Said ring members and tool head are provided with interengaging flanges 15, 16, and said ring members and wheel hub are provided with interengaging flanges 17, 18, said latter members being rigidly secured or locked together by means of screws 19 extending through said flanges. As clearly shown in Fig. 2, said tool head is provided with a depending marginal flange or skirt 20 snugly surrounding the upper portion of sleeve base 6, thereby effectively preventing the entrance of dirt and other objectionable matter to the space or clearance 21 between the adjacent faces of the tool head and the sleeve base.

The under face of the tool head is provided with a series of circumferentially disposed, vertically extending sockets 22, four being shown, in each of which is slidably mounted a locking pin 23, said pins being normally forced downwardly by springs 24 fitted in recesses 25 in said pins and engaging the upper ends of sockets 22. The upper face of the annular sleeve base 6 is provided with a series of correspondingly disposed recesses 26, which are adapted to receive the substantially spherical heads 27 of pins 23, by which means the tool head and the sleeve base are non-rotatably secured together, said pins also forming the usual indexing device of the tool post, as will be readily understood. Due to the substantially spherical shape of the heads 27 of pins 23, and the cooperating substantially semi-spherical shape of the recesses in the head and the sleeve base, said pin heads have a wedging action in each of the head and sleeve recesses, with the result that lost motion is effectively prevented and inaccuracy of work avoided. Moreover, the particular shape of said pin heads and the sleeve recesses enables the indexing of the rotatable head to be easily and effectively accomplished.

Pivotally mounted on said tool head are one or more substantially square, tubular tool holders 28, four being shown, which are arranged horizontally about the four sides of the tool head with the front end of each tool holder extending beyond the head, as clearly indicated in Figs. 3 and 4. Each of said tool holders is provided substantially midway of its ends with a substantially cylindrical pivot pin 29 preferably formed integral therewith and extending at right angles thereto, said pins being adapted to be removably secured in suitable recesses 30 in the tool head. In the embodiment here shown, each of said pivot pins is provided, preferably adjacent its tool holder, with two oppositely disposed, substantially wedge shaped wings or projections 31. Recesses 30 are so formed that the pivot pins of said tool holders can be passed through the restricted mouth 31ª of said recesses only when their projections 31 are in vertical position, said pins being securely held in said openings upon turning their projections to a horizontal position, as clearly shown in Fig. 5.

The various tools (not shown) are secured in openings 32 of the tool holders by set screws 33 near the front ends thereof, so that said tools are longitudinally adjustable toward and from the work. Each tool holder is provided at its rear end with a substantially flat rearward extension 34 which is adapted to be engaged by a set screw 35 mounted in a suitable boss 36 on the tool head, it being understood that there is a boss and a set screw at each side of the tool head, one for each tool holder. Each tool holder is therefore individually adjustable about its axis so that the tool therein may be inclined at any desired angle, the adjustment being maintained by a lock nut 37 on set screw 35.

From the foregoing it will be understood that to move another tool into operative or working position, wheel 10 is turned in a counter-clockwise direction by means of handle 11, which movement raises head 12 and moves pin heads 27 from recesses 26 in the sleeve base 6. When the desired tool has been brought to proper working position, the heads 27 of locking pins 23 will snap into recesses 26, whereupon the head and the sleeve base are non-rotatably secured together. Wheel 10 is then turned in a clockwise direction to firmly clamp said parts together.

What I claim is:

1. A turret tool post, comprising a spindle having a head for attachment to a lathe rest, a sleeve surrounding said spindle and having a flanged base adapted to engage said lathe rest, a nut threaded upon said spindle for engagement with said sleeve, whereby the flanged base of said sleeve may be firmly clamped against said lathe rest, a tool head surrounding said sleeve and over-lying the flanged base thereof, said tool head being provided with tool holding means, operating means for said tool head threaded to said sleeve, means for operatively connecting said tool head with said operating means, whereby rotary movement of said operating means relative to said sleeve effects longitudinal movement of said tool head relative to said sleeve, said connecting means being provided with flanges for interlocking engagement with a flange of said tool head and a flange of said operating means, the flanged base of said sleeve being provided with a series of recesses, and spring pressed members associated with said tool head and adapted for co-operation with the recesses of the flanged base of said sleeve.

2. A turret tool post, comprising a spindle having a head for attachment to a lathe rest, a sleeve surrounding said spindle and having a flanged base adapted to engage said lathe rest, a nut threaded upon said spindle for engagement with said sleeve, whereby the flanged base of said sleeve may be firmly clamped against said lathe rest, a tool head surrounding said sleeve and over-lying the flanged base thereof, said tool head being provided with tool holding means, a wheel member having its hub portion threaded upon said sleeve, a pair of substantially semi-circular ring members for operatively connecting the tool head to said wheel member, whereby rotary movement of said wheel member relative to said sleeve effects longitudinal movement of said tool head relative to said sleeve, each of said ring members being provided with flanges for interlocking engagement with a flange of said tool head and a flange of the hub portion of said wheel member, the flanged base of said sleeve being provided with a series of recesses, and spring actuated members associated with said tool head and adapted for co-operation with the recesses of the flanged base of said sleeve.

In testimony whereof I hereby affix my signature.

MILAN BOZSIN.